United States Patent
Park

(10) Patent No.: US 8,405,259 B2
(45) Date of Patent: Mar. 26, 2013

(54) STEP MOTOR

(75) Inventor: Jungbum Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 252 days.

(21) Appl. No.: 12/900,922

(22) Filed: Oct. 8, 2010

(65) Prior Publication Data

US 2011/0084560 A1    Apr. 14, 2011

(30) Foreign Application Priority Data

Oct. 8, 2009  (KR) .......................... 10-2009-0095435

(51) Int. Cl.
*H02K 37/00* (2006.01)

(52) U.S. Cl. ............ 310/49.01; 310/80; 310/83; 310/91

(58) Field of Classification Search ............... 310/49.01, 310/80, 83, 91; H02K 37/00
See application file for complete search history.

(56) References Cited

U.S. PATENT DOCUMENTS

| | | | | |
|---|---|---|---|---|
| 3,983,429 A | * | 9/1976 | Allardice, Jr. ................. | 310/91 |
| 4,381,747 A | * | 5/1983 | Kobayashi et al. ...... | 123/339.26 |
| 5,212,417 A | * | 5/1993 | Nagai et al. ................ | 310/49.15 |
| 6,317,287 B1 | * | 11/2001 | Yano et al. .................... | 360/260 |
| 6,951,424 B2 | * | 10/2005 | Mutai et al. ................... | 384/610 |
| 2004/0070287 A1 | * | 4/2004 | Corbett et al. ................. | 310/12 |
| 2008/0088209 A1 | * | 4/2008 | Ryu ............................. | 310/49 R |
| 2011/0084560 A1 | * | 4/2011 | Park ......................... | 310/49.01 |

FOREIGN PATENT DOCUMENTS

| | | |
|---|---|---|
| KR | 10-2007-0101729 A | 10/2007 |
| KR | 10-2007-0101730 A | 10/2007 |

OTHER PUBLICATIONS

Office Action dated Feb. 18, 2011 in Korean Application No. 10-2009-0095435, filed Oct. 8, 2009.

* cited by examiner

*Primary Examiner* — John K Kim

(74) *Attorney, Agent, or Firm* — Saliwanchik, Lloyd & Eisenschenk

(57) ABSTRACT

Disclosed herein is a step motor, including a lead screw, a rotor fixed to an outer surface of the lead screw, a fixture containing a stator disposed to face the rotor and a housing whose one side end part is open to insert the stator and wrap the stator, and a bracket having a bracket body of a plate shape on which the housing is disposed and a bending part bent towards the one side end part of the housing from the bracket body.

9 Claims, 3 Drawing Sheets ent in its entirety.

STEP MOTOR

CROSS-REFERENCE TO RELATED APPLICATION

This application claims the benefit under 35 U.S.C. §119 of Korean Application No. 10-2009-0095435, filed Oct. 8, 2009, which is hereby incorporated by reference in its entirety.

BACKGROUND

1. Field of the Invention

The present invention is directed to a step motor.

2. Description of the Related Art

An ODD (Optical Disk Driver) includes a step motor. The step motor is installed inside the optical disk driver to drive an optical pick-up. The optical pick-up travels along in a radial direction of an optical disk by means of a step motor whilst reading a data recorded in a disk or recording data into a disk.

In general, a step motor encompasses a bracket and a housing. The bracket and housing rotatably supports one end and the other end of a lead screw. One pair of bobbins may be installed at the inner part of a housing. A coil winds on the outer surface of a bobbin, and a tooth yoke is coupled at the inner surface of a bobbin. Around an outer surface of a lead screw positioned inside the housing is fixed a rotor.

In a case the housing is welded to a bracket, a coupling intensity between the housing and the bracket turns lowered. Thus, by an external force from outside, a warping of the bracket and/or housing may be easily observed.

When the housing and/or the bracket may be bent by the external force, a gap formed between the rotor formed on the lead screw and the stator is changed so that noise during the rotation of the lead screw may be generated or a torque of a step motor may be decreased.

BRIEF SUMMARY

The present invention provides a step motor having an enhanced coupling intensity between a housing and a bracket by improving a coupling structure of the housing and the bracket.

A step motor of the present invention includes a lead screw; a rotor fixed to an outer surface of the lead screw; a fixture containing a stator disposed to face the rotor and a housing whose one side end part is open to insert the stator and wrap the stator and; and a bracket having a bracket body of a plate shape on which the housing is disposed and a bending part bent towards the one side end part of the housing from the bracket body.

DETAILED DESCRIPTION

Figure 1:
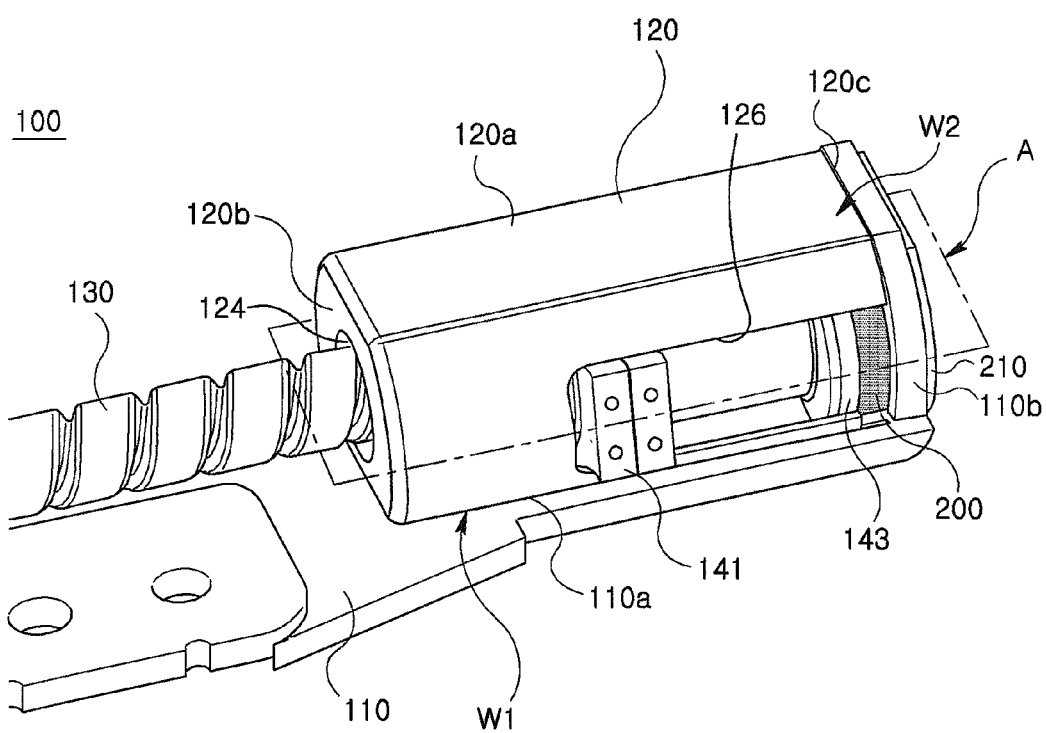
FIG. 1 is a perspective view showing an upper surface of a step motor of the present invention.
Figure 2:
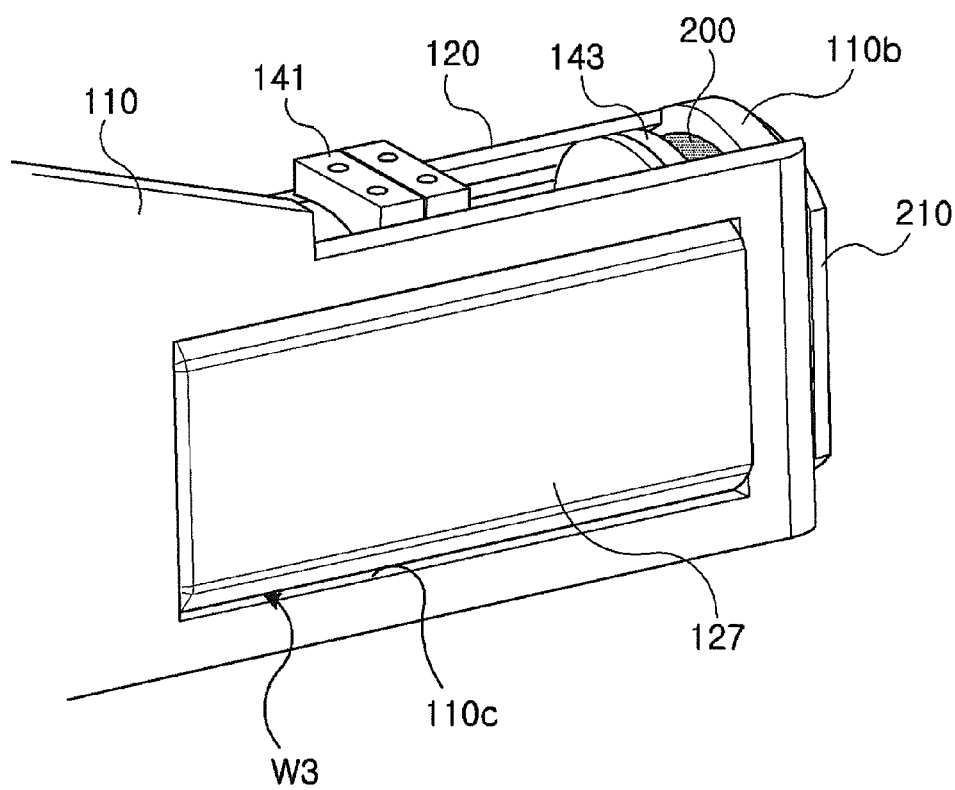
FIG. 2 is a perspective view showing a rear surface of a step motor of the present invention.
Figure 3:
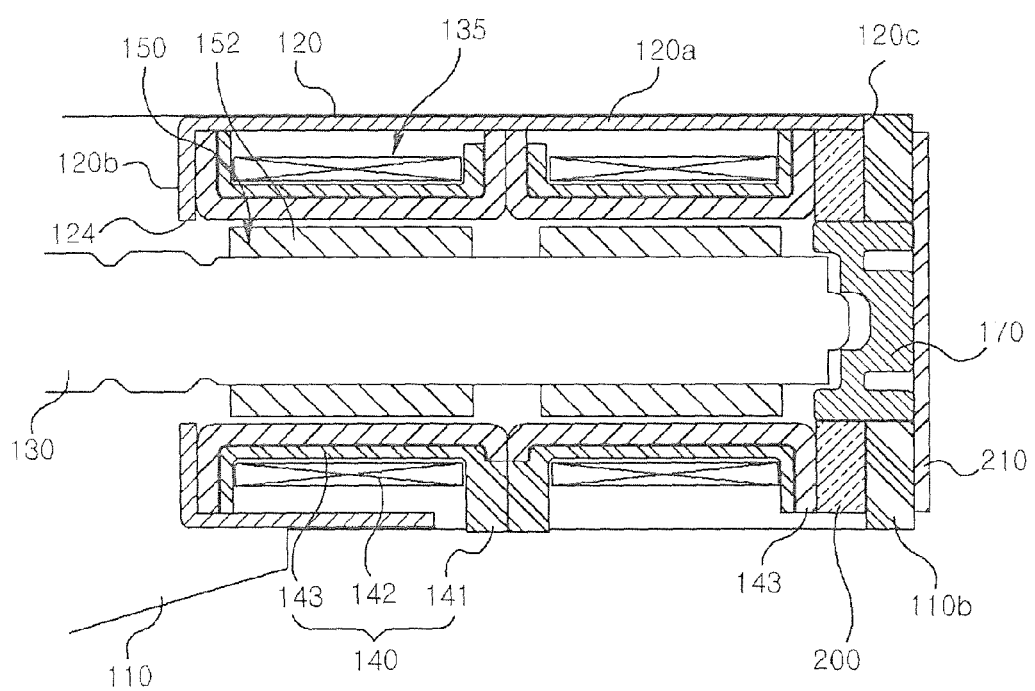
FIG. 3 is a floor cross-sectional view of a cut plane 'A' in FIG. 1.

FIG. 1 is a perspective view showing an upper surface of a step motor of the present invention, FIG. 2 is a perspective view showing a rear surface of a step motor of the present invention, and FIG. 3 is a floor cross-sectional view of a cut plane 'A' in FIG. 1.

Hereinafter, a step motor and an assembling method thereof of the present invention will be described in detail with reference to FIG. 1 and FIG. 3 together.

The depicted step motor 100 includes a lead screw 130, a rotor 150, a stator 140, a housing 120 and a bracket 110.

The stator 140 is formed of cylindrical shape for inserting the rotor 150, the stator 140 has wired on its surface by a coil 142 producing a magnetic field, and the stator 140 is fixed within the cylindrical housing 120.

By means of an electric power applied to the coil 142 winded into the stator 140, a magnetic field from the coil 142 is produced, and on the strength of a repulsion force from the magnetic field from the coil 142 and a magnetic field produced by a magnet 152 included in the rotor 150, the rotor 150 rotates.

The lead screw 130 may be coupled to the inner surface of the rotor 150 formed with a pipe shape, the lead screw 130 rotates together with the rotor 150.

The stator 140 includes a bobbin 141 disposed inside the housing 120, a coil 142 winded on an outer surface of the bobbin 141, and a tooth yoke 143 coupled at the inner side of the bobbin 141.

One end part of a lead screw 130 disposed outside the housing 120 is supported by a ball bearing (not shown) coupled to one side of the bracket 110 and a ball sheet (not shown) supportive of this.

The one end part and the other opposite part of a lead screw 130 coupled to the bracket 110 is supported by a thrust holder 170 coupled into the housing 120.

While a ball bearing is not interposed between the other end part of a lead screw and a thrust holder 170, it is also allowable to interpose any ball bearing between the other end part of the lead screw 130 and the thrust holder 170.

On the one hand, in order to give pressure to the thrust holder 170 in an axial direction of the lead screw 130, a plate spring 210 is coupled to a later-described bending part 110b formed perpendicularly to the bracket 110.

The plate spring 210 gives pressure by a predetermined force to the lead screw 130 contacting with the thrust holder 170, to improve a rotation torque of a motor and realize low-level noise.

The housing 120 is formed of cylindrical shape being one side open, and the housing 120 includes a body part 120a and a lateral surface part 120b.

The body part 120a may be formed of cylindrical shape, and the body part 120a extends to an axial direction of the lead screw 130. On the lower surface of the body part 120a among the body part 120a facing a later-described bracket 110, a coupling part 127 protruded from the lower surface of the body part 120a is formed as shown in FIG. 2.

The body part 120a has a stator insertion groove 126 inserting the stator 140.

The lateral surface part 120b may be formed at one end part of the body part 120a, and the lateral surface part 120b has a through hole 124 running through the lead screw 130.

The other end part 120c opposite to the one end part of the body part 120a that forms the lateral surface part 120b may be open, and a stator 140 wrapping out the rotor 150 disposed at the outer surface of the lead screw 130 inserts into the other part 120c.

To reduce rotating noise of the lead screw 130 and also prohibit rocking of the housing 120, a step motor 100 may include a guide member 200. One side of the guide member 200 adheres to the stator 140, and another side opposing said one side of the guide member 200 is disposed at the bending part 110b of a later described bracket 110.

The housing 120 may be disposed on the bracket 110. One side of the bracket 110 at which the housing 120 is disposed rotatively supports an end part of the lead screw 130 protruded from the housing 120, the other side opposite to said one side of the bracket 110 is bent in a housing 120 destined direction, and the other end part 120c of the body part 120a of a housing 120 is fixed to the bent other side in a bracket 110.

The bracket 110 includes a bracket body 110a fixing the body part 120a of a housing 120, and a bending part 110b bent from the bracket 110 and having an opening formed to fix the other end part 120c of the housing 120.

A bracket body 110a of the bracket 110 fixed to the body part 120a of the housing 120 is provided with an opening part 110c inserting at least one of the body part 120a of the housing 120.

A portion of contacting the body part 120a of the housing 120 with the bracket body 110a of the bracket 110 has a first welding part W1, a portion of contacting the other end part 120c of the body part 120a of the housing 120 with the bending part 110b of the bracket 110 has a second welding part W2, and a portion of contacting the body part 120a of the housing 120 with an opening part 110c of the bracket 110 forms a third welding part W3.

At least one of the first through third welding part W1, W2, W3 may be welded, and as a result, the housing 120 is firmly coupled to the bracket 110.

Hereinafter, a description will be provided with regard to an assembling method of the step motor 100 of the present invention. When the housing 120 is fixed to the bracket in accordance with the present invention, the housing 120 is disposed on the bracket 110 and the other end part 120c of the body part 120a of the housing 120 is fixed to the bending part 110b of the bracket 110 so that an entire housing 120 can be supported by the bracket 110. Therefore, a warp occurrence of the housing 120 can be prohibited and a change to a coaxial state of the lead screw 130 can be prevented.

The stator 140 may be inserted inside the housing 120 through the other end part 120c of the body part 120a of the housing 120. Successively, the lead screw 130 may be inserted from the other end part 120c of the body part 120a of the housing 120 towards a through hole 124.

Successively, at least one of a thrust holder 170 supporting one side of the lead screw 130 and a guide member 200 adhering to the stator 140 may be inserted inside the housing 120 from the other end part 120c of the body part 120a of the housing 120. Accordingly, the rocking and rotating noise of a motor can be reduced.

The other end part 120c of the body part 120a of the housing 120 is fixed to one side of the bending part 110b of the bracket 110, and a plate spring 210 is fastened to outside of the bending part 110b of the bracket 110. Accordingly, the thrust holder 170 may be given pressure by the plate spring 210 in an axial direction of the lead screw 130, and resultantly, uniform pressure may be applied to the lead screw 130.

The bracket 110 and the housing 120 are fastened using at least one of the first welding part W1, the second welding part W2 and the third welding W3. By doing this, the bracket 110 can support the entire part of the housing 120, and a warp occurrence of the housing 120 or a coaxial twisting of the lead screw 130 will be prohibited.

While embodiments according to the present invention have been described above, these are only by way of example and it would be understood by those skilled in the art that any embodiment of various modifications and equivalents can be made thereto. Thus, the genuine technical scope of the present invention should be defined from the accompanying claims.

What is claimed is:

1. A step motor comprising:
a lead screw;
a rotor coupled to an outer surface of the lead screw;
a stator including a magnet disposed to face the rotor and a housing whose one side end part is open to insert the magnet and surround the magnet; and
a bracket having a bracket body of a plate shape on which the housing is disposed and a bending part bent towards the one side end part of the housing from the bracket body,
wherein an end part of the housing faces an inner surface of the bending part and is contacted by and fixed to the inner surface of the bending part.

2. The step motor of claim 1, further comprising a thrust holder rotatively supporting one side end of the lead screw, wherein the bending part includes an opening part into which the thrust holder is inserted.

3. The step motor of claim 2, wherein the housing encloses a portion of the lead screw in an axial direction, and wherein the housing comprises a body part having a closed end part and a lateral surface part in which a through hole is formed, wherein the lead screw passes through the through hole of the lateral surface part.

4. The step motor of claim 3, wherein a portion of a lower surface of the body part of the housing facing the bracket body of the bracket is formed with a coupling part protruded from said lower surface of the body part.

5. The step motor of claim 4, wherein the bracket body of the bracket is formed with an opening part inserting the coupling part.

6. The step motor of claim 5, wherein the housing and the bracket are welded at one or more of a first welding part formed in a portion of contacting the body part of the housing with the bracket body of the bracket, a second welding part formed in a portion of contacting the other end part of the body part of the housing with the bending part of the bracket, and a third welding part formed in a portion of contacting the coupling part of the body part of the housing with an opening part of the bracket.

7. The step motor of claim 3, further comprising a plate spring applying pressure to the thrust holder in an axial direction of the lead screw.

8. The step motor of claim 7, wherein the plate spring is fastened to the outer side surface of the bending part of the bracket.

9. The step motor of claim 7, further comprising: a guide member disposed at an inner side surface of the bending part to pass through the thrust holder at a center portion of the guide member.

* * * * *